(12) United States Patent
Nakano et al.

(10) Patent No.: US 8,290,608 B2
(45) Date of Patent: Oct. 16, 2012

(54) MANUFACTURING INSTRUCTION EQUIPMENT, PROGRAM, MANUFACTURING INSTRUCTION SYSTEM, AND MANUFACTURING INSTRUCTION METHOD

(75) Inventors: Takahiro Nakano, Fujisawa (JP); Yoichi Nonaka, Yokohama (JP); Hisaya Ishibashi, Yokohama (JP); Satoshi Nagahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/846,274

(22) Filed: Jul. 29, 2010

(65) Prior Publication Data

US 2011/0046769 A1 Feb. 24, 2011

(30) Foreign Application Priority Data

Aug. 18, 2009 (JP) .................................. 2009-189306

(51) Int. Cl.
*G06F 19/00* (2011.01)
(52) U.S. Cl. .......................... 700/106; 700/100; 700/103
(58) Field of Classification Search .................. 700/100, 700/103, 106

See application file for complete search history.

(56) References Cited

U.S. PATENT DOCUMENTS

| | | | | |
|---|---|---|---|---|
| 6,438,436 | B1* | 8/2002 | Hohkibara et al. | 700/97 |
| 6,606,527 | B2* | 8/2003 | de Andrade et al. | 700/97 |
| 7,437,205 | B2* | 10/2008 | Knipfer et al. | 700/106 |
| 2005/0149219 | A1* | 7/2005 | Lilly et al. | 700/100 |
| 2006/0106660 | A1* | 5/2006 | Varekamp | 705/8 |

FOREIGN PATENT DOCUMENTS

| | | | |
|---|---|---|---|
| JP | 2004-295679 | * | 3/2003 |
| JP | 2004-295679 | | 10/2004 |

\* cited by examiner

*Primary Examiner* — Mohammad Ali
*Assistant Examiner* — Sivalingam Sivanesan
(74) *Attorney, Agent, or Firm* — McDermott Will & Emery LLP

(57) ABSTRACT

The present teaching is intended to observe the delivery date of a product and decrease the number of workpieces in a merger process. A treatment sequence calculator included in manufacturing instruction equipment identifies an in-process part being worked in each process, and calculates the delivery-date allowance of the in-process part. In-process parts whose delivery-date allowances fall below a predetermined threshold are inputted to each process in ascending order of delivery-date allowances. In-process parts whose delivery-date allowances are equal to or larger than the predetermined threshold are inputted to each process in ascending order by a minimum value of remaining treatment times which the in-process parts take to reach the merger process.

17 Claims, 8 Drawing Sheets

FIG. 4

| ORDER NUMBER | PRODUCT NUMBER | PRODUCT | DELIVERY DATE (YEAR/MONTH/DAY) | CUSTOMER |
|---|---|---|---|---|
| S0001 | AA0254 | PRODUCT A | 2009/05/15 | COMPANY A |
| S0002 | AA0220 | PRODUCT B | 2009/05/16 | COMPANY B |
| S0003 | AA0321 | PRODUCT C | 2009/05/16 | COMPANY C |
| S0004 | AA0110 | PRODUCT D | 2009/05/18 | COMPANY D |
| S0005 | AA0334 | PRODUCT E | 2009/05/18 | COMPANY E |
| S0006 | AA0337 | PRODUCT F | 2009/05/18 | COMPANY F |
| ⋮ | ⋮ | ⋮ | ⋮ | ⋮ |

FIG. 5

| PRODUCT NUMBER | PRODUCT | COMPONENT PART | PROCESS ROUTE | MERGER PROCESS |
|---|---|---|---|---|
| AA0254 | PRODUCT A | STATOR | 0551 | ASSEMBLING PROCESS |
| AA0254 | PRODUCT A | ROTOR | 0332 | ASSEMBLING PROCESS |
| AA0220 | PRODUCT B | STATOR | 0330 | ASSEMBLING PROCESS |
| AA0220 | PRODUCT B | ROTOR | 0421 | ASSEMBLING PROCESS |
| AA0321 | PRODUCT C | STATOR | 0332 | ASSEMBLING PROCESS |
| AA0321 | PRODUCT C | ROTOR | 0520 | ASSEMBLING PROCESS |
| ⋮ | ⋮ | ⋮ | ⋮ | ⋮ |

FIG. 6

| PROCESS ROUTE | PROCESS | TREATMENT TIME |
|---|---|---|
| 0221 | COIL PROCESS | 8.0 |
| 0221 | COIL MOUNTING PROCESS | 12.0 |
| 0221 | DRYING PROCESS | 6.5 |
| 0221 | ASSEMBLING PROCESS | 8.5 |
| 0221 | SHIPPING PROCESS | 4.5 |
| 0222 | COIL PROCESS | 9.0 |
| 0222 | COIL MOUNTING PROCESS | 12.0 |
| 0222 | DRYING PROCESS | 6.0 |
| 0222 | ASSEMBLING PROCESS | 10.5 |
| ⋮ | ⋮ | ⋮ |

FIG. 7

| PRODUCT NUMBER | PART | MANUFACTURE PROCESS | TERMINATION TIME | INITIATION TIME |
|---|---|---|---|---|
| AA0254 | STATOR | DRYING PROCESS | 2009/04/22 17:00 | 2009/04/22 17:30 |
| AA0254 | ROTOR | DRYING PROCESS | 2009/04/22 18:00 | 2009/04/22 19:00 |
| AA0321 | STATOR | COIL MOUNTING PROCESS | 2009/04/23 9:00 | |
| AA0321 | ROTOR | COIL MOUNTING PROCESS | 2009/04/23 10:00 | |
| AA0220 | STATOR | COIL MOUNTING PROCESS | 2009/04/23 12:00 | |
| AA0220 | ROTOR | DRYING PROCESS | 2009/04/23 13:30 | |
| AA0110 | STATOR | COIL PROCESS | 2009/04/23 16:00 | |
| AA0110 | ROTOR | COIL MOUNTING PROCESS | 2009/04/24 13:00 | |
| AA0334 | STATOR | COIL PROCESS | 2009/04/24 14:30 | |
| ⋮ | ⋮ | ⋮ | ⋮ | ⋮ |

| ITEM | VALUE |
|---|---|
| CRITERION FOR DELAY IN DELIVERY | 1.0 |
| TIME INTERVAL (Hr) | 20 |

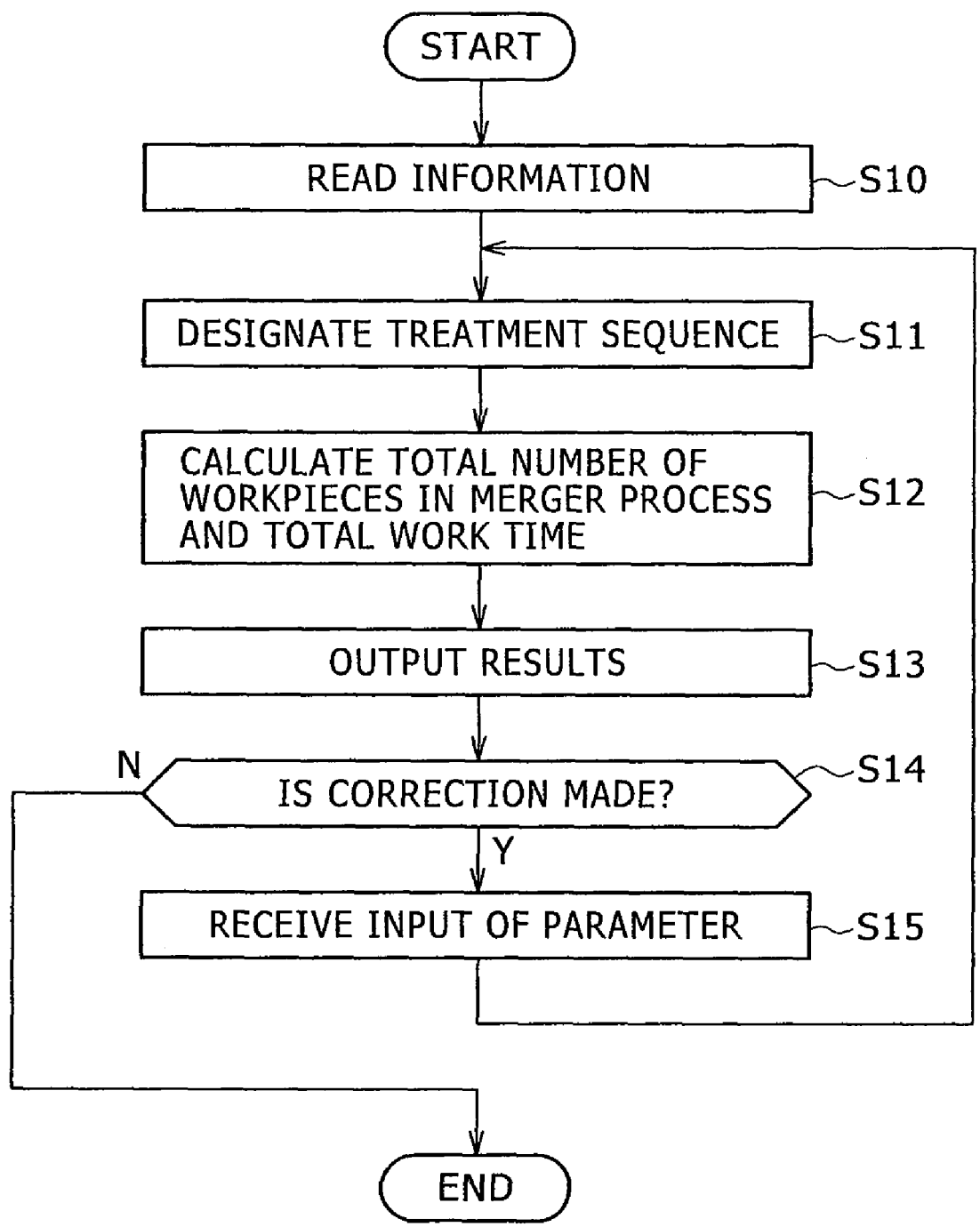

FIG.11

RESULTS OUTPUT SCREEN — 192a

TREATMENT SEQUENCE

| PRODUCT NUMBER | PART | TREATMENT SEQUENCE | DELIVERY-DATE ALLOWANCE | PROXIMITY [Hr] |
|---|---|---|---|---|
| AA4501 | ROTOR | 1 | 0.3 | 10 |
| AA0301 | ROTOR | 2 | 0.4 | 22 |
| AA0020 | ROTOR | 3 | 0.6 | 15 |
| AA0010 | ROTOR | 4 | 2.7 | 5 |
| AA0302 | ROTOR | 5 | 3.2 | 8 |
| AA1101 | ROTOR | 6 | 2.6 | 10 |
| AA0210 | ROTOR | 7 | 2.2 | 12 |
| AA0202 | ROTOR | 8 | 1.9 | 15 |
| AA4502 | ROTOR | 9 | 2.8 | 22 |

TREATMENT SEQUENCE

COIL MOUNTING PROCESS — 192b

RESULTS OUTPUT SCREEN — 192a

WORK TIME

| PRODUCT NUMBER | PART | PROCESS IN WHICH PART IS BEING WORKED | TREATMENT TIME IT TAKES BY MERGER[Hr] | WORK TIME[Hr] |
|---|---|---|---|---|
| AA4301 | STATOR | COIL MOUNTING PROCESS | 20 | 10 |
|  | ROTOR | DLYING PROCESS | 10 |  |
| AA0021 | STATOR | DLYING PROCESS | 30 | 15 |
|  | ROTOR | DLYING PROCESS | 45 |  |
| AA1121 | STATOR | COIL MOUNTING PROCESS | 65 | 15 |
|  | ROTOR | COIL PROCESS | 80 |  |
| AA4502 | STATOR | COIL MOUNTING PROCESS | 20 | 22 |
|  | ROTOR | CANNING PROCESS | 42 |  |
| AA1123 | STATOR | COIL PROCESS | 40 | 20 |

WORK TIME

TOTAL WORK TIME IN MERGER PROCESS

82 Hr — 192d

192e

RESULTS OUTPUT SCREEN

TOTAL NUMBER OF WORKPIECES

| PRODUCT NUMBER | TIME | | |
|---|---|---|---|
| AA4301 | WORK TIME | | |
| AA0021 | | WORK TIME | |
| AA1121 | | | |
| AA4502 | | WORK TIME | |
| AA1123 | | WORK TIME | |
| TOTAL NUMBER OF WORKPIECES | T+ST<br>1 PIECE | T+2*ST<br>3 PIECES | 1 PIECE |

T: CURRENT TIME
ST: TIME INTERVAL

MANUFACTURING INSTRUCTION EQUIPMENT, PROGRAM, MANUFACTURING INSTRUCTION SYSTEM, AND MANUFACTURING INSTRUCTION METHOD

RELATED APPLICATION

This application claims the benefit of priority from Japanese Application No. JP-2009-189306 filed on Aug. 18, 2009 entitled "Manufacturing instruction equipment, program, manufacturing instruction system, and manufacturing instruction method," the disclosure of which also is entirely incorporated herein by reference.

TECHNICAL FIELD

The present subject matter relates to a technology for designating a treatment sequence of inputting in-process parts to each process.

BACKGROUND

For job shop type made-to-order products such as an industrial machine and a motor, a production plan or manufacturing instructions have to be determined in order to manufacture the products by a delivery date a customer has requested.

For example, Japanese Patent Application Laid-Open Publication No. 2004-295679 describes a technology for, for the purpose of observing a delivery date, performing manufacturing instruction so that in-process parts can be processed in ascending order of delivery-data allowances each of which is calculated as a ratio of a remaining treatment time it takes to complete a final process to a remaining time left by the delivery date.

SUMMARY

For example, on an assembly line for an industrial machine or motor on which plural sub-lines merge into a main line, since large parts gather in the merger process, there is a possibility that there may be no vacancy in an in-process parts yard for the merger process. The number of workpieces in the merger process is a critical issue.

However, a technology for creating a treatment sequence on the basis of allowances to delivery dates does not, similarly to the technology described in Japanese Patent Application Laid-Open Publication No. 2004-295679, take account of treatment times which each part takes before it reaches the merger process. The arrival times of parts may be inconsistent with one another, and all the parts may not come together. Therefore, in the merger process, work cannot be begun on a part having arrived earlier, and the number of workpieces may increase.

Accordingly, an object of the present subject matter is to observe a delivery date and decrease the number of workpieces in a merger process.

In order to solve the aforesaid problems, according to the present subject matter, among in-process parts to be used for products that have little time left by delivery dates, an in-process part that takes a short remaining treatment time to reach a merger process is treated as a top priority.

For example, according to the present subject matter, there is provided manufacturing instruction equipment that designates a treatment sequence of inputting in-process parts to each process, and that includes a memory unit and a control unit. The memory unit stores: order information that specifies a product and the delivery date of the product; parts organization information that specifies a product, parts constituting the product, process routes along which the parts are manufactured, and a merger process in which the parts along the process routes are merged with other parts having traveled along other process routes; process route information that specifies a process route, processes included in the process route, and treatment times it takes in the respective processes; and work result information that specifies a product, parts constituting the part, processes to which the parts belong, and whether the parts are being treated in the respective processes. The control unit performs: the processing of identifying a part, which belongs to a process but is not treated in the process, as an in-process part in the process on the basis of the work result information; the processing of identifying a process route for the in-process part and the merger process on the basis of the parts organization information; the processing of tallying treatment times which the in-process part takes in processes preceding the merger process along the process route, calculating a remaining treatment time which the in-process part takes to reach the merger process, calculating a remaining time left by the delivery date of a product including the in-process part, and dividing the remaining time by the remaining treatment time so as to work out a delivery-date allowance; the processing of, for in-process parts whose delivery-date allowances fall below a predetermined threshold, designating a treatment sequence of inputting the in-process parts to each process in ascending order of delivery-date allowances, and of, for in-process parts whose delivery-date allowances are equal to or larger than the predetermined threshold, designating a treatment sequence of inputting the in-process parts to each process in ascending order by a minimum value of remaining treatment times which parts constituting a product, which includes each of the in-process parts whose delivery-date allowances are equal to or larger than the predetermined threshold, take to reach the merger process.

As mentioned above, according to the present teachings, a delay in delivery can be reduced, and the number of workpieces in a merger process can be decreased.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed example discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a schematic diagram of an order information table;

FIG. 5 is a schematic diagram of a parts organization information table;

FIG. 6 is a schematic diagram of a process route information table;

FIG. 7 is a schematic diagram of a work result information table;

FIG. 10 is a flowchart describing the processing of designating a treatment sequence for parts being worked in each process;

FIG. 11 is a schematic diagram showing an example of a display screen;

FIG. 12 is a schematic diagram showing an example of a display screen;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
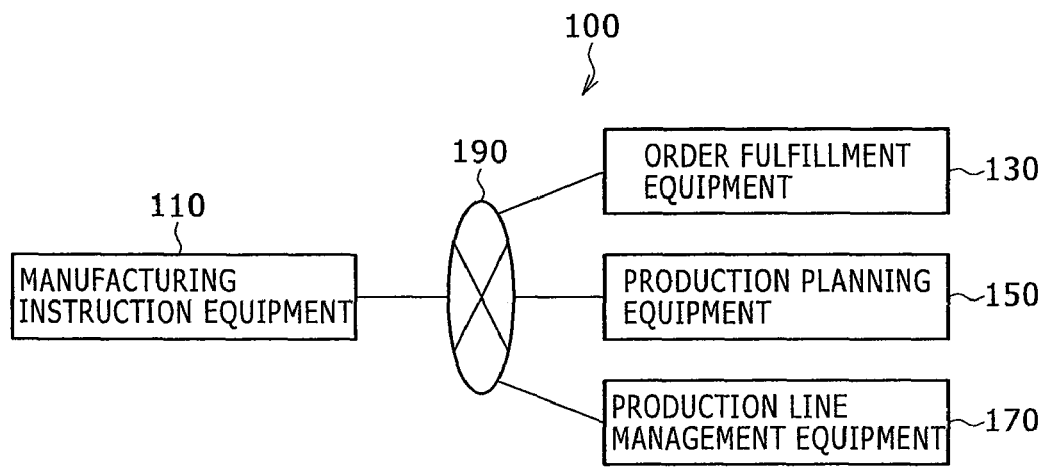
FIG. 1 is a schematic diagram of a manufacturing instruction system.

FIG. 1 is a schematic diagram of a manufacturing instruction system 100 in accordance with an example. As shown in FIG. 1, the manufacturing instruction system 100 includes manufacturing instruction equipment 110, order fulfillment equipment 130, production planning equipment 150, and production line management equipment 170. The pieces of equipment can transfer information to or from one another over a network 190.

The present subject matter is concerned with manufacturing instruction (designation of a treatment sequence) to be performed on an assembly line for an industrial machine or a motor on which plural sub-lines to which processes are assigned merge into a main line.

Figure 2:
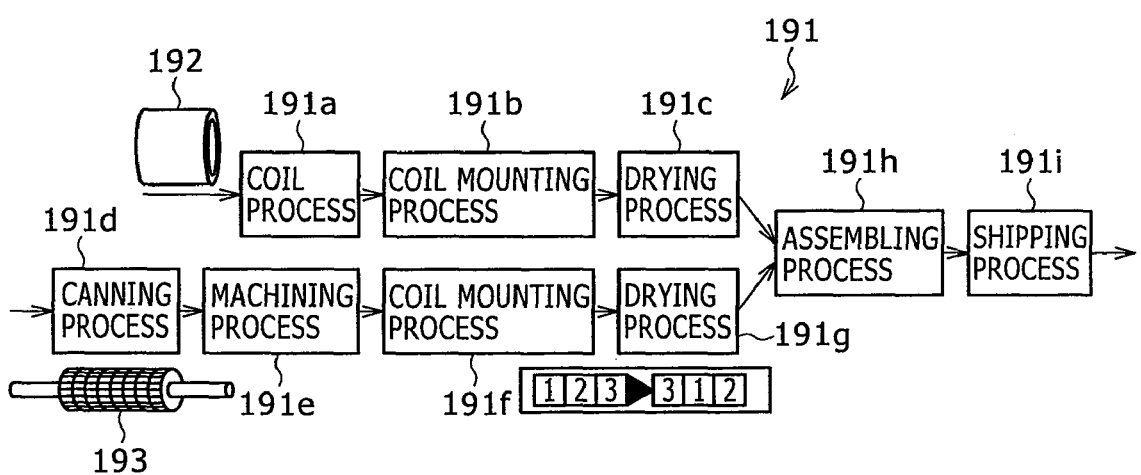
FIG. 2 is a schematic diagram showing an example of an assembly line.

For example, on an assembly line like an assembly line 191 for large-scale motors shown in FIG. 2 (schematic diagram showing an example of an assembly line), a stator 192 to be produced through sub-line processes starting with a coil process 191*a* and ending with a drying process 191*c*, and a rotor 193 to be produced through sub-line processes starting with a canning process 191*d* and ending with a drying process 191*g* merge with each other in an assembling process 191*h* that is a main-line process for producing the motors which are finished products and that proceeds to a shipping process 191*i*.

On the assembly line 191, process routes differ from product to product. Any of all processes may not be passed through. In addition, a treatment time it takes in each process differs from product to product. Therefore, a treatment time a part takes to pass through processes preceding the assembling process 191*h* differs from part to part. Times at which parts arrive at the assembling process 191*h* are inconsistent with one another. Eventually, the number of workpieces in the assembling process 191*h* increases.

In the manufacturing instruction system 100 in which the example is implemented, a treatment sequence for in-process parts in each of processes on the assembly line 191 is immediately determined and provided for a user.

Figure 3:
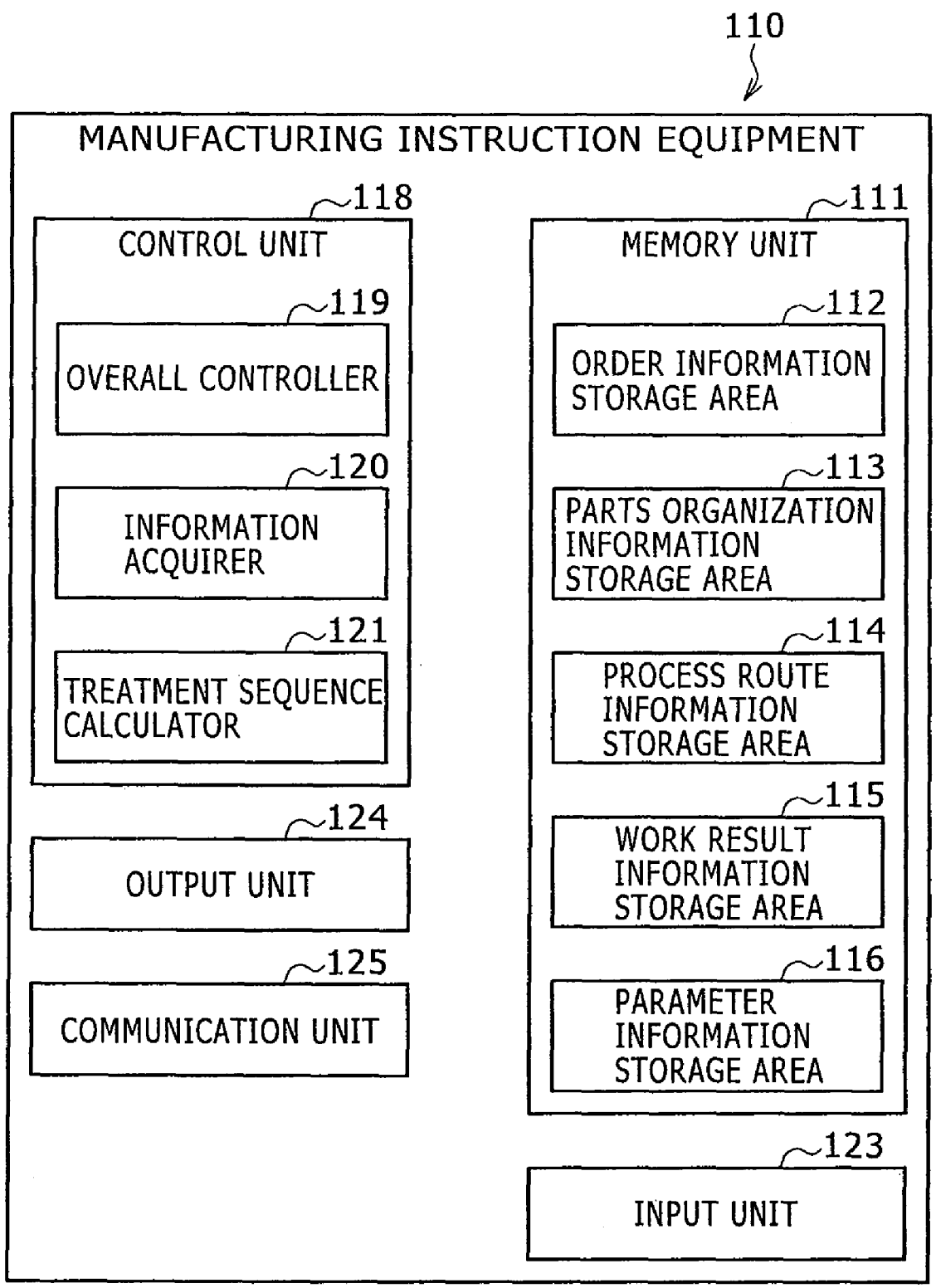
FIG. 3 is a schematic diagram of manufacturing instruction equipment.

FIG. 3 is a schematic diagram of manufacturing instruction equipment 110. As shown in the drawing, the manufacturing instruction equipment 110 includes a memory unit 111, a control unit 118, an input unit 123, an output unit 124, and a communication unit 125.

The memory unit 111 includes an order information storage area 112, a parts organization information storage area 113, a process route information storage area 114, a work result information storage area 115, and a parameter information storage area 116.

In the order information storage area 112, order information that specifies the delivery date of each product is stored. For example, in the present example, an order information table 112*a* like the one shown in FIG. 4 (schematic diagram of the order information table 112*a*) is stored.

As shown in FIG. 4, the order information table 112*a* has an order number column 112*b*, a product number column 112*c*, a product column 112*d*, a delivery-date column 112*e*, and a customer column 112*f*.

In the order number column 112*b*, identification information for use in uniquely identifying each order placed is contained. Herein, an order number assigned to a placed order is contained.

In the product number column 112*c*, a product number that is identification information specifying a product for which an order specified in the order number column 112*b* is placed is contained.

In the product column 112*d*, a product name of a product for which an order specified in the order number column 112*b* is placed is contained.

In the delivery date column 112*e*, information specifying the delivery date of a product, for which an order specified in the order number column 112*b* is placed, is contained. Herein, the delivery date is specified in the form of year/month/day but is not limited to the form.

In the customer column 112*f*, information specifying a customer to which a product for which an order specified in the order number column 112*b* is placed is delivered is contained.

Referring back to FIG. 3, in the parts organization information storage area 113, parts organization information that specifies, for each product, parts constituting a product, and process routes along which the parts are manufactured is stored. For example, in the present example, a parts organization information table 113*a* like the one shown in FIG. 5 (schematic diagram of the parts organization information table 113*a*) is stored.

As shown in FIG. 5, the parts organization information table 113*a* has a product number column 113*b*, a product column 113*c*, a component part column 113*d*, a process route column 113*e*, and a merger process column 113*f*.

In the product number column 113*b*, a product number that is identification information specifying a product is contained.

In the product column 113*c*, information specifying a product name of a product specified in the product number column 113*b* is contained.

In the component part column 113*d*, information specifying a part included in the product specified in the product number column 113*b* is contained. Herein, a part name is contained as the information specifying a part.

In the process route column 113*e*, information specifying a process route along which a part specified in the component part column 113*d* and included in a product specified in the product number column 113*b* is contained. Herein, a process route number that is allocated uniquely to each process route is contained as the information specifying a process route.

In the merger process column 113f, information specifying a process in which a part manufactured through a sub-line, which is included in an assembly line for manufacturing a product specified in the product number column 113b, merge with the others is contained. Herein, a process name is stored as the information specifying a process.

Referring back to FIG. 3, in the process route information storage area 114, process route information specifying processes included in a process route, and treatment times it takes in the processes is stored. For example, in the present example, a process route information table 114a like the one shown in FIG. 6 (schematic diagram of the process route information table 114a) is stored.

As shown in FIG. 6, the process route information table 114a has a process route column 114b, a process column 114c, and a treatment time column 114d.

In the process route column 114b, information specifying each process route is contained.

In the process column 114c, information specifying a process included in a process route specified in the process route column 114b is contained. The records of processes included in each process route shall be handled in order from the uppermost record.

In the treatment time column 114d, information specifying a treatment time it takes in a process specified in the process column 114c and included in a process route specified in the process route column 114b is contained.

Referring back to FIG. 3, in the work result information storage area 115, work result information that specifies, for each of parts constituting a product, a process in which a part is waiting for treatment or being treated and a termination time of a process preceding the process is stored. For example, in the present example, a work result information table 115a like the one shown in FIG. 7 (schematic diagram of the work result information table 115a) is stored.

As shown in FIG. 7, the work result information table 115a has a product number column 115b, a part column 115c, a manufacture process column 115d, a termination time column 115e, and an initiation time column 115f.

In the product number column 115b, a product number that is identification information specifying a product is contained.

In the part column 115c, information specifying a part included in a product specified in the product number column 115b is contained.

In the manufacture process column 115d, information specifying a process, in which a part specified in the part column 115c and included in a product specified in the product number column 115b is waiting for treatment or being treated, is contained.

In the termination time column 115e, information (year/month/day/time) specifying the termination time of a treatment in a process preceding the process specified in the manufacture process column 115d is contained.

In the initiation time column 115f, information (year/month/day/time) specifying an initiation time at which a treatment in a process specified in the manufacture process column 115d is initiated is contained. If the treatment in the process specified in the manufacture process column 115d is not initiated, the initiation time column is left blank.

Referring back to FIG. 3, in the parameter information storage area 116, parameter information specifying a parameter for use in deciding on a delay in delivery is stored. For example, in the present example, a parameter information table 116a like the one shown in FIG. 8 (schematic diagram of the parameter information table 116a) is stored.

Figures 8, 9:
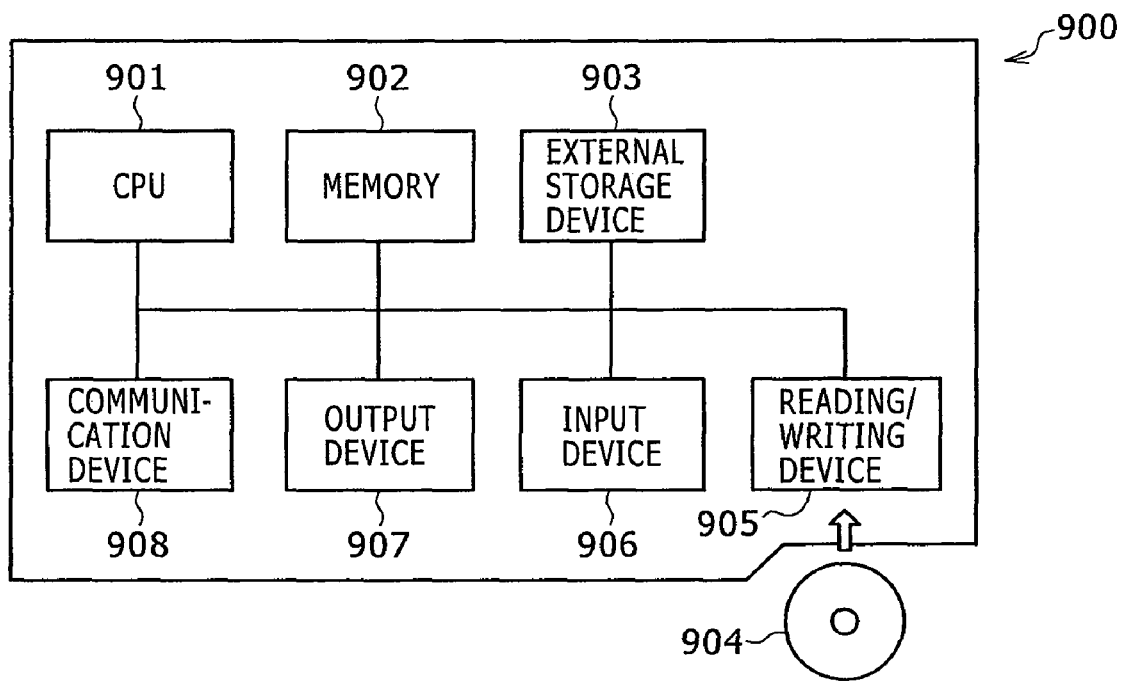
FIG. 8 is a schematic diagram of a parameter information table.
FIG. 9 is a schematic diagram of a computer.

As shown in FIG. 8, the parameter information table 116a has an item column 116b and a value column 116c.

In the item column 116b, information specifying an item of a parameter is contained. Herein, each of "Criterion for a delay in delivery" and "Time interval" is contained as the information specifying an item.

In the value column 116c, information specifying a value associated with an item specified in the item column 116b is contained.

Referring back to FIG. 3, the control unit 118 includes an overall controller 119, an information acquirer 120, and a treatment sequence calculator 121.

The overall controller 119 controls all pieces of processing to be performed in the manufacturing instruction equipment 110.

The information acquirer 120 acquires necessary information from the order fulfillment equipment 130, production planning equipment 150, or production line management equipment 170, and stores it in the memory unit 111.

For example, the information acquirer 120 performs the processing of acquiring information, which is contained as a record in the order information table 112a, from the order fulfillment equipment 130, and recording the information in the order information table 112a.

The information acquirer 120 performs the processing of acquiring information, which is contained as a record in each of the parts organization information table 113a and process route information table 114a, from the production planning equipment 150, and recording the information in each of the parts organization information table 113a and process route information table 114a.

Further, the information acquirer 120 performs the processing of acquiring information, which is contained as a record in the work result information table 115a, from the production line management equipment 170, and recording the information in the work result information table 115a.

Now, at predetermined timing, the information acquirer 120 may acquire information from each of the order fulfillment equipment 130, production planning equipment 150, and production line management equipment 170. Otherwise, when information is sent from any of the pieces of equipment, the information acquirer may record the information in the associated table.

The treatment sequence calculator 121 performs the processing of designating a treatment sequence for parts that are being worked in each process.

For example, the treatment sequence calculator 121 calculates a delivery-date allowance of a part being worked in each process. For parts that have little time left by the delivery dates, the treatment sequence calculator designates a treatment sequence of treating the parts in each process in ascending order of allowances to the delivery dates. For parts that have some time left by the delivery dates, the treatment sequence calculator designates a treatment sequence of treating the parts in each process in ascending order of proximities to a merger process.

The input unit 123 receives an input of information.

The output unit 124 outputs information.

The communication unit 125 transfers information over the network 190.

The foregoing manufacturing instruction equipment 110 can be realized with, for example, a typical computer 900 including, as shown in FIG. 9 (schematic diagram of the computer 900), a central processing unit (CPU) 901, a memory 902, an external storage device 903 such as a hard disk drive (HDD), a reading/writing device 905 that reads or writes information from or in a storage medium 904 having portability, such as, a compact disk (CD) or digital versatile disk (DVD), an input device 906 such as a keyboard or a mouse, an output device 907 such as a display, and a communication unit 908 such as a network interface card (NIC) for connecting the computer onto a communication network.

For example, the memory unit 111 can be realized with the memory 902 or external storage device 903 which the CPU 901 utilizes. The control unit 118 can be realized with a predetermined program that is stored in the external storage device 903, loaded into the memory 902, and then run by the control of the CPU 901. The input unit 123 can be realized with the input device 906 which the CPU 901 utilizes. The output unit 124 can be realized with the output device 907 which the CPU 901 utilizes. The communication unit 125 can be realized with the communication device 908 which the CPU 901 utilizes.

The predetermined program may be downloaded from the storage medium 904 to the external storage device 903 via the reading/writing device 905 or may be downloaded to the external storage device 903 via the communication device 908 over a network, loaded into the memory 902, and then run by the CPU 901. Otherwise, the predetermined program may be loaded from the storage medium 904 directly to the memory 902 via the reading/writing device 905 or may be loaded directly to the memory 902 via the communication device 908 over a network, and then run by the CPU 901.

The order fulfillment equipment 130 accepts placement of an order by a costumer, and transmits order information on the placed order to the manufacturing instruction equipment 110 at predetermined timing or in response to a request issued from the manufacturing instruction equipment 110.

The production planning equipment 150 receives an input of parts organization information and process route information from a user of the manufacturing instruction system 100, and transmits the received parts organization information and process route information to the manufacturing instruction equipment 110 at predetermined timing or in response to a request issued from the manufacturing instruction equipment 110.

The production line management equipment 170 receives an input of work result information from a production system allocated to each production line, or a user of the production system, and transmits the received work result information to the manufacturing instruction equipment 110 at predetermined timing or in response to a request issued from the manufacturing instruction equipment 110.

FIG. 10 is a flowchart describing the processing of designating a treatment sequence for parts being worked in each process.

First, the treatment sequence calculator 121 reads the order information table 112a, parts organization information table 113a, process route information table 114a, work result information table 115a, and parameter information table 116a from the memory unit 111 (S10).

Thereafter, the treatment sequence calculator 121 creates a treatment sequence for parts on the basis of allowances of parts to delivery dates in each of processes preceding a merger process (herein, an assembling process), and proximities of the parts to the merger process (S11). The processing of step S11 will be detailed in conjunction with FIG. 14. The treatment sequence for the parts in each of processes succeeding the merger process may be designated according to an arbitrary method. For example, the parts may be treated in ascending order of delivery-date allowances.

Thereafter, the treatment sequence calculator 121 calculates the total number of workpieces of products (herein, motors) in the merger process, and a total work time (S12).

For example, the treatment sequence calculator 121 references the parts organization information table 113a so as to tally a record, which does not specify an initiation time in the initiation time column 115f and is contained in the work result information table 115a, in association with each of processes included in each of the process routes for each product, and thus identifies a part being worked in each process.

In addition, the treatment sequence calculator 121 references the treatment time column 114d of the process route information table 114a so as to identify treatment times which a part being worked in each process among a set of parts constituting a motor j (where j denotes a natural number that is assigned to each motor in order to discriminate one motor from another, that begins with 1, and that meets $1 \leq j \leq n$) takes before it reaches the assembling process. The treatment sequence calculator 121 thus tallies the treatment times, which the part being worked in each process takes before it reaches the assembling process, so as to calculate a remaining treatment time for the part being worked in each process.

Assuming that $MaxM_j$ denotes a maximum value of remaining treatment times which parts being worked in each process among a set of parts constituting the motor j take to reach the assembling process, and $MinM_j$ denotes a minimum value of the remaining treatment times which the parts take to reach the assembling process, the treatment sequence calculator 121 calculates a work time $WT_j$, which the parts i constituting the motor j (where i denotes a natural number that is assigned to each part in order to discriminate one part from another and that begins with 1) take in the assembling process, according to an equation (1) below.

$$WT_j = MaxM_j - MinM_j \qquad (1)$$

According to the equation (1), the work time each motor takes in the assembling process on the assembly line can be calculated.

Further, assuming that n denotes the total number of motors (where n denotes a natural number), the total work time $TWT_j$ the motors take is provided as an equation (2) below.

$$TWT_j = \sum_{j=1}^{n} WT_j \qquad (2)$$

According to the equation (2), the work time all products take in the assembling process on the assembly line can be calculated.

In addition, the treatment sequence calculator 121 calculates the total number of workpieces of motors in the assembling process on the basis of the time interval contained in the parameter information table 116a.

For example, assuming that T denotes a current time, ST denotes a time interval, and $MinM_j$ denotes a minimum value of remaining treatment times a set of parts constituting the motor j takes to reach the assembling process, parts of the motor j relative to which an inequality (3) below is established are being worked in the assembling process during a period T+ST beginning with the current time T. According to the inequality (3), the treatment sequence calculator 121 calculates the total number of workpieces in the assembling process on the assembly line at intervals of the time interval ST.

$$T < T + MinM_j \wedge T + ST > T + MinM_j \qquad (3)$$

Thereafter, the treatment sequence calculator 121 manipulates a predetermined display screen image using the allowances to delivery dates, the proximities to the assembling process, and the treatment sequence for parts, which are calculated at step S11, and the total work time for products in the assembling process and the total number of workpieces of products in the assembling process, which are calculated at step S12, and outputs the image to the output unit 124 (S13).

FIG. 11 is a schematic diagram showing an example of the display screen image 192. The example shown in FIG. 11 is an example to be displayed after Treatment Sequence is selected in a display selection field 192a to be described later.

As shown in FIG. 11, the display screen image 192 includes the display selection field 192a, a process selection field 192b, and a treatment sequence display field 192c.

If Treatment Sequence is selected in the display section field 192a, after a process for which a treatment sequence is displayed is selected in the process selection field 192b, information specifying the treatment sequence for in-process parts (identified with product number and part names) to be worked in the process is displayed together with information, which specifies the delivery-date allowances and proximities, in the treatment sequence display field 192c.

Owing to the display screen image 192, a user of the manufacturing instruction equipment 110 can reference the treatment sequence, the allowances of the parts, which are treated according to the treatment sequence, to the delivery dates, and the proximities to the assembling process as reference information for use in re-designating a criterion for a delay in delivery contained in the parameter information table 116a.

FIG. 12 is a schematic diagram showing an example of a display screen image. The example shown in FIG. 12 is an example to be displayed after Work Time is selected in the display selection field 192a.

As shown in FIG. 12, the display screen image 192 includes the display selection field 192a, a total work time-in-merger process field 192d, and a work time display field 192e.

If Work Time is selected in the display selection field 192a, a total work time in the merger process is displayed in the total work time-in-merger process field 192d. In the work time display field 192e, information specifying a process in which each of parts constituting each product is being worked, a remaining treatment time the part takes to reach the merger process, and a total work time the product takes in the merger process is displayed.

Owing to the display screen image 192, a user of the manufacturing instruction equipment 110 can reference the work time a product takes in the assembling process and the total work times products take in the assembling process as reference information for use in re-designating a criterion for a delay in delivery contained in the parameter information table 116a.

Figures 13, 14:
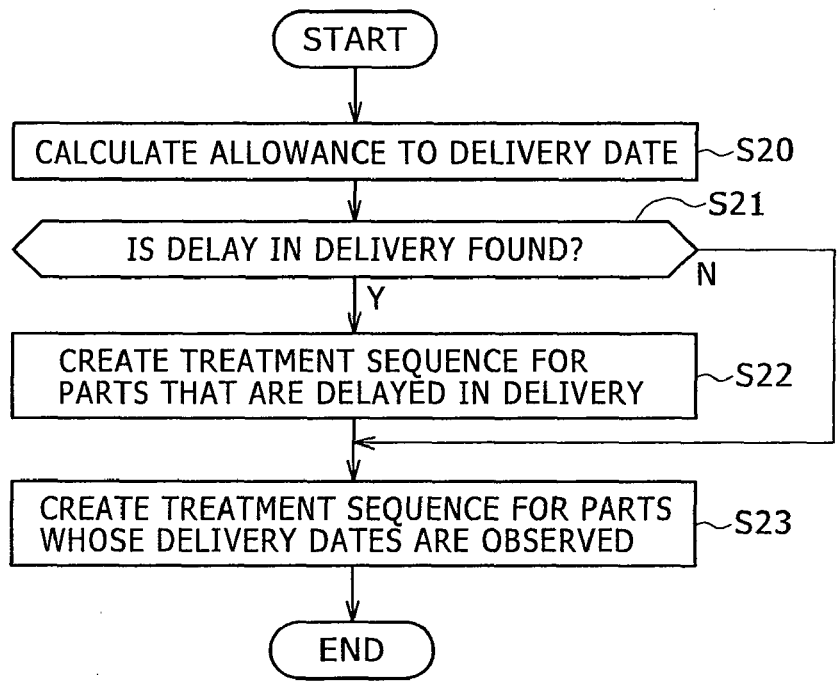
FIG. 13 is a schematic diagram showing an example of a display screen.
FIG. 14 is a flowchart describing the processing of creating a treatment sequence for parts.

FIG. 13 is a schematic diagram showing an example of a display screen image. The example shown in FIG. 13 is an example to be displayed after Total number of Workpieces is selected in the display selection field 192a.

As shown in FIG. 13, the display screen image 192 has the display selection field 192a and a total number-of-workpieces display field 192f.

If Total number of Workpieces is selected in the display selection field 192a, information specifying a work time each product takes in the assembling process and the total number of workpieces is displayed in the total number-of-workpieces display field 192f.

Owing to the display screen image 192, a user of the manufacturing instruction equipment 110 can reference the total number of workpieces in the assembling process, which is obtained at intervals of a time interval, as reference information for use in re-designating a criterion for a delay in delivery contained in the parameter information table 116a.

Referring back to FIG. 10, a user of the manufacturing instruction equipment 110 references the display screen image 192. If the total work time and the total number of workpieces meet the user's criteria, processing is terminated because correction is not performed (No at step S14). If the total work time and the total number of workpieces do not meet the user's criteria, since correction is performed (Yes at step S14), the processing proceeds to step S15.

At step S15, the treatment sequence calculator 121 receives an input of a correction value for the criterion for a delay in delivery, which is contained in the parameter information table 116a, from the user of the manufacturing instruction equipment 110 via the input unit 123, and returns to step S11 so as to repeat the processing.

If the user of the manufacturing instruction equipment 110 places emphasis on observation of a delivery date, the user re-designates a smaller value for the criterion for a delay in delivery. If the user places emphasis on the work time or the number of workpieces, the user re-designates a larger value for the criterion for a delay in delivery.

FIG. 14 is a flowchart describing the processing of creating a treatment sequence for parts at step S11 in FIG. 10.

To begin with, the treatment sequence calculator 121 calculates an allowance of each part to a delivery date (S20).

For example, assuming that $P_i$ denotes a remaining treatment time it takes to complete of the shipping process for a part i and $T_i$ denotes a remaining time left by a delivery time, a delivery-date allowance $C_i$ is provided as an equation (4) below.

$$C_i = \frac{T_i}{P_i} \quad (4)$$

Thereafter, the treatment sequence calculator 121 identifies a part, which is delayed in delivery, on the basis of the value of the criterion for a delay in delivery contained in the parameter information table 116a, and the allowance to a delivery date calculated at step S20 (S21).

For example, assuming that K denotes the value of the criterion for a delay in delivery and $C_i$ denotes a delivery-date allowance of a part i, if $C_i < K$ is satisfied, the treatment sequence calculator 121 recognizes the part as the one that is delayed in delivery. If $C_i \geq K$ is satisfied, the treatment sequence calculator 121 recognizes the part as the one whose delivery date is observed.

Thereafter, the treatment sequence calculator 121 creates a treatment sequence for parts, which are recognized at step S21 as those that are delayed in delivery, so that the parts are treated in ascending order of delivery-date allowances thereof calculated at step S20 (S22).

Thereafter, the treatment sequence calculator 121 defines as a proximity a minimum value of remaining treatment times all parts, which constitute a product including a part recognized at step S21 as the one whose delivery date is observed, take to reach the merger process, and creates a treatment sequence so that the parts recognized as those whose delivery dates are observed are treated in ascending order of proximities. When the treatment sequence created at step S22 is concerned with a certain process, the treatment sequence created at step S22 is succeeded by the treatment sequence of treating parts in ascending order of proximities (S23). Thus, a treatment sequence permitting a reduction in a work time for parts that reach the merger process earlier can be realized.

For example, assuming that $M_i$ denotes a remaining treatment time it takes a part i to reach the assembling process and $F_j$ denotes a set of parts constituting a motor j, the proximity $N_i$ of the motor to the assembling process is provided as an equation (5) below.

$$N_i = \min_{i \in F_j}(Mi) \quad (5)$$

According to the equation (5), the proximity of each product (motor) to the merger process (assembling process) on the assembly line can be calculated.

As for parts whose proximity values calculated according to the equation (5) are identical to one another, a maximum value of remaining treatment times which all parts constituting a product take to reach the assembling process is defined as a remoteness. A treatment sequence for the parts whose proximity values are identical to one another is created so that the parts are treated in ascending order by the remoteness. Thus, even for the parts whose proximity values calculated according to the equation (5) are identical to one another, the treatment sequence permitting a reduction in a work time of parts reaching the assembling process earlier can be realized.

For example, assuming that $M_i$ denotes a remaining treatment time it takes a part i to reach the assembling process and $F_j$ denotes a set of parts constituting a motor j, a remoteness $D_i$ of the motor from the assembling process is provided as an equation (6) below.

$$D_i = \max_{i \in F_j}(M_j) \quad (6)$$

According to the equation (6), the remoteness of each product (motor) from the merger process (assembling process) on an assembly line can be calculated.

As mentioned above, according to the present example, a treatment sequence for observing a customer-requested delivery date and minimizing the number of workpieces in an assembling process on an assembly line for products can be created.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. Manufacturing instruction equipment which designates a treatment sequence of inputting in-process parts to each process, comprising:
    a memory unit; and
    a control unit,
    wherein the memory unit stores:
        order information specifying a product and the delivery date of the product;
        parts organization information specifying a product, parts constituting the product, process routes along which the parts are manufactured, and a merger process in which the parts along the process routes are merged with other parts having traveled along other process routes;
        process route information specifying a process route, processes included in the process route, and treatment times which it takes in the processes; and
        work result information specifying a product, parts constituting the product, processes to which the parts belong, and whether the parts are being treated in the processes, and
    wherein the control unit performs:
        the processing of identifying a part, which belongs to a process but is not treated in the process, as an in-process part in the process on the basis of the work result information;
        the processing of identifying the process route for the in-process part and the merger process on the basis of the parts organization information;
        the processing of tallying treatment times, which the in-process part takes in processes preceding the merger process along the process route, on the basis of the process route information, calculating a remaining treatment time which the in-process part takes to reach the merger process, calculating a remaining time left by the delivery date of a product including the in-process part, and dividing the remaining time by the remaining treatment time so as to calculate a delivery-data allowance; and
        the processing of, for in-process parts whose delivery-data allowances fall below a predetermined threshold, designating a treatment sequence of inputting the in-process parts to each process in ascending order of delivery-date allowances, and of, for in-process parts whose delivery-date allowances are equal to or larger than the predetermined threshold, designating a treatment sequence of inputting the in-process parts to each process in ascending order by a minimum value of remaining treatment times which parts constituting a product, which includes each of the in-process parts whose delivery-date allowances are equal to or larger than the predetermined threshold, take to reach the merger process.

2. The manufacturing instruction equipment according to claim 1, wherein assuming that the delivery-date allowances of in-process parts are equal to or larger than the predetermined threshold, and that when a minimum value of remaining treatment times which parts constituting a product, which includes each of the in-process parts whose delivery-date allowances are equal to or larger than the predetermined threshold, take to reach the merger process is obtained, the minimum values relevant to the in-process parts are equal to one another, the control unit designates, for the in-process parts, a treatment sequence of inputting the in-process parts in ascending order by a maximum value of the remaining treatment times which the parts constituting the product, which includes each of the in-process parts whose delivery-date allowances are equal to or larger than the predetermined threshold, take to reach the merger process.

3. The manufacturing instruction equipment according to claim 1, wherein the control unit performs the processing of designating a treatment sequence so that after in-process parts whose delivery-date allowances fall below a predetermined threshold are treated, in-process parts whose delivery-date allowances are equal to or larger than the predetermined threshold are treated.

4. The manufacturing instruction equipment according to claim 3, wherein the control unit performs the processing of expressing a treatment sequence for in-process parts in each process in a predetermined display format, and then outputting it to an output unit.

5. The manufacturing instruction equipment according to claim 3, wherein the control unit performs the processing of:
calculating a work time, which it takes in the merger process, by subtracting a minimum value of remaining treatment times, which parts included in each product take to reach the merger process, from a maximum value of the remaining treatment times which the parts included in each product take to reach the merger process; and
expressing the remaining treatment times, which the parts included in each product take to reach the merger process, and the work time in a predetermined display format, and outputting them to the output unit.

6. The manufacturing instruction equipment according to claim 3, wherein the control unit performs the processing of tallying the total number of in-process parts in the merger process at intervals of a specific time interval, expressing the specific time interval and the total number of in-process parts in a predetermined display format, and outputting them to the output unit.

7. The manufacturing instruction equipment according to claim 3, wherein when receiving an input of a correction value for the threshold via an input unit, the control unit re-designates the treatment sequence.

8. A non-transitory computer readable medium storing a program causing a computer to execute a process for acting as manufacturing instruction equipment that designates a treatment sequence of inputting in-process parts to each process,
wherein the computer includes a memory unit and a control unit,
wherein the memory unit stores:
order information specifying a product and the delivery date of the product;
parts organization information specifying a product, parts constituting the product, process routes along which the parts are manufactured, and a merger process in which the parts along the process routes are merged with other parts having traveled along other process routes;
process route information specifying a process route, and processes included in the process route, and treatment times it takes in the processes; and
work result information specifying a product, parts constituting the product, processes to which the parts belong, and whether the parts are being treated in the processes, and
wherein execution of the program by the control unit causes the control unit to perform functions comprising:
processing of identifying a part, which belongs to a process but is not treated in the process, as an in-process part in the process on the basis of the work result information;
processing of identifying the process route for the in-process part and the merger process on the basis of the parts organization information;
processing of tallying treatment times, which the in-process part takes in processes preceding the merger process along the process route, on the basis of the process route information, calculating a remaining treatment time which the in-process part takes to reach the merger process, calculating a remaining time left by the delivery date of a product including the in-process part, and dividing the remaining time by the remaining treatment time so as to calculate a delivery-date allowance; and
processing of, for in-process parts whose delivery-date allowances fall below a predetermined threshold, designating a treatment sequence of inputting the in-process parts in ascending order of delivery-date allowances, and of, for in-process parts whose delivery-date allowances are equal to or larger than the predetermined threshold, designating a treatment sequence of inputting the in-process parts in ascending order by a minimum value of remaining treatment times which parts constituting a product, which includes each of the in-process parts whose delivery-date allowances are equal to or larger than the predetermined threshold, take to reach the merger process.

9. The medium according to claim 8, wherein assuming that the delivery-date allowances of in-process parts are equal to or larger than the predetermined threshold, and that when a minimum value of remaining treatment times which parts constituting a product, which includes each of the in-process parts whose delivery-date allowances are equal to or larger than the predetermined threshold, take to reach the merger process is obtained, the minimum values relevant to the in-process parts are equal to one another, execution of the program further causes the control unit to designate, for the in-process parts, a treatment sequence of inputting the in-process parts in ascending order by a maximum value of the remaining treatment times which the parts constituting a product, which includes each of the in-process parts whose delivery-date allowances are equal to or larger than the predetermined threshold, take to reach the merger process.

10. The medium according to claim 8, wherein in each process, execution of the program further causes the control unit to perform the processing of designating a treatment sequence so that after in-process parts whose delivery-date allowances fall below the predetermined threshold are treated, in-process parts whose delivery-date allowances are equal to or larger than the predetermined threshold are treated.

11. The medium according to claim 10, wherein execution of the program further causes the control unit to perform the processing of expressing a treatment sequence for in-process parts in each process in a predetermined display format, and outputting it to an output unit.

12. The medium according to claim 10, wherein execution of the program further causes the control unit to perform the processing of:
calculating a work time, which it takes in the merger process, by subtracting a minimum value of remaining treatment times, which parts included in each product take to reach the merger process, from a maximum value of the remaining treatment times which the parts included in each product take to reach the merger process; and
expressing the remaining treatment times which the parts included in each product take to reach the merger process, and the work time in a predetermined display format, and outputting them to the output unit.

13. The medium according to claim 10, wherein execution of the program further causes the control unit to perform the processing of tallying the total number of in-process parts in the merger process at intervals of a specific time interval, expressing the specific time interval and the total number of in-process parts in a predetermined display format, and outputting them to the output unit.

14. The medium according to claim 10, wherein execution of the program further causes the control unit to re-designate a treatment sequence when receiving an input of a correction value for the threshold via an input unit.

15. A manufacturing instruction system which designates a treatment sequence of inputting in-process parts to each process, comprising:
   a memory unit; and
   a control unit,
   wherein the memory unit stores:
      order information specifying a product and the delivery date of the product;
      parts organization information specifying a product, parts constituting the product, process routes along which the parts are manufactured, and a merger process in which the parts along the process routes are merged with other parts having traveled along other process routes;
      process route information specifying a process route, processes included in the process route, and treatment times it takes in the processes; and
      work result information specifying a product, parts constituting the product, processes to which the parts belong, and whether the parts are being treated in the processes, and
   wherein the control unit performs:
      processing of identifying a part, which belongs to a process but is not treated in the process, as an in-process part on the basis of the work result information;
      processing of identifying the process route for the in-process part and the merger process on the basis of the parts organization information;
      processing of tallying treatment times, which the in-process part takes in processes preceding the merger process along the process route, on the basis of the process route information, calculating a remaining treatment time which the in-process part takes to reach the merger process, calculating a remaining time left by the delivery date of a product including the in-process part, and dividing the remaining time by the remaining treatment time so as to calculate a delivery-date allowance; and
      processing of, for in-process parts whose delivery-date allowances fall below a predetermined threshold, designating a treatment sequence of inputting the in-process parts to each process in ascending order of delivery-date allowances, and of, for in-process parts whose delivery-date allowances are equal to or larger than the predetermined threshold, designating a treatment sequence of inputting the in-process parts to each process in ascending order by a minimum value of remaining treatment times which parts constituting a product, which includes each of the in-process parts whose delivery-date allowances are equal to or larger than the predetermined threshold, take to reach the merger process.

16. A manufacturing instruction method for designating a treatment sequence of inputting in-process parts to each process by manufacturing instruction equipment including a memory unit and a control unit,
   wherein the memory unit stores:
      order information specifying a product and the delivery date of the product;
      parts organization information specifying a product, parts constituting the product, process routes along which the parts are manufactured, and a merger process in which the parts along the process routes are merged with other parts having traveled along other process routes;
      process route information specifying a process route, processes included in the process route, and treatment times which it takes in the processes; and
      work result information specifying a product, parts constituting the product, processes to which the parts belong, and whether the parts are being treated in the processes, and
   wherein the method comprises the control unit performing steps of:
      processing of identifying a part, which belongs to a process but is not treated in the process, as an in-process part in the process on the basis of the work result information;
      processing of identifying the process route for the in-process part and the merger process on the basis of the parts organization information;
      processing of tallying treatment times which the in-process part takes in processes preceding the merger process along the process route, calculating a remaining treatment time which the in-process part takes to reach the merger process, calculating a remaining time left by the delivery date of a product including the in-process part, and dividing the remaining time by the remaining treatment time so as to calculate a delivery-date allowance; and
      processing of, for in-process parts whose delivery-date allowances fall below a predetermined threshold, designating a treatment sequence of inputting the in-process parts to each process in ascending order of delivery-date allowances, and of, for in-process parts whose delivery-date allowances are equal to or larger than the predetermined threshold, designating a treatment sequence of inputting the in-process parts to each process in ascending order by a minimum value of remaining treatment times which parts constituting a product, which includes each of the in-process parts whose delivery-date allowances are equal to or larger than the predetermined threshold, take to reach the merger process.

17. An article of manufacture comprising a program for causing the control unit to perform the method of claim 16, and a medium bearing the program.

* * * * *